Oct. 28, 1941.  W. H. GRINT  2,260,282
PRODUCTION OF FLEXIBLE TUBES AND PIPES
Filed Oct. 23, 1937  8 Sheets-Sheet 1

INVENTOR
W H GRINT
BY
ATTORNEYS

Oct. 28, 1941.  W. H. GRINT  2,260,282
PRODUCTION OF FLEXIBLE TUBES AND PIPES
Filed Oct. 23, 1937  8 Sheets-Sheet 2

INVENTOR
W. H. GRINT.
BY
ATTORNEYS

Oct. 28, 1941.  W. H. GRINT  2,260,282
PRODUCTION OF FLEXIBLE TUBES AND PIPES
Filed Oct. 23, 1937  8 Sheets-Sheet 3
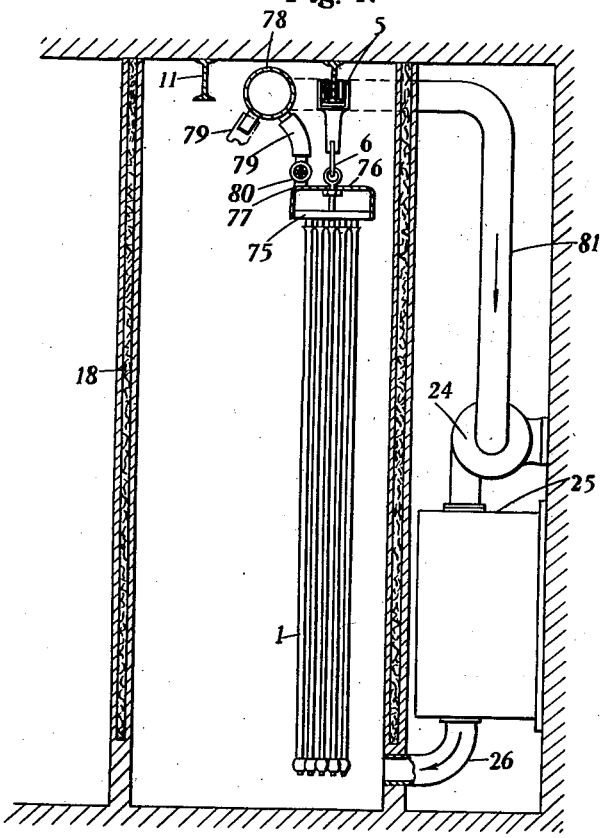
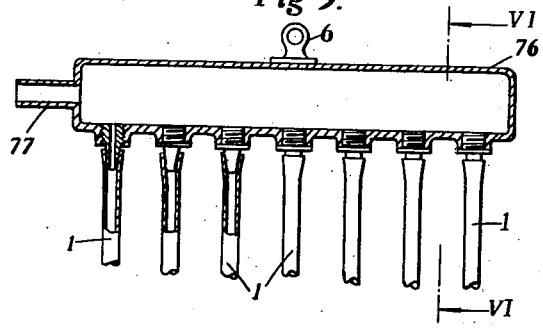
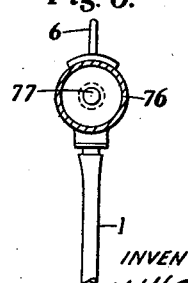
INVENTOR
W. H. GRINT.
BY
ATTORNEYS

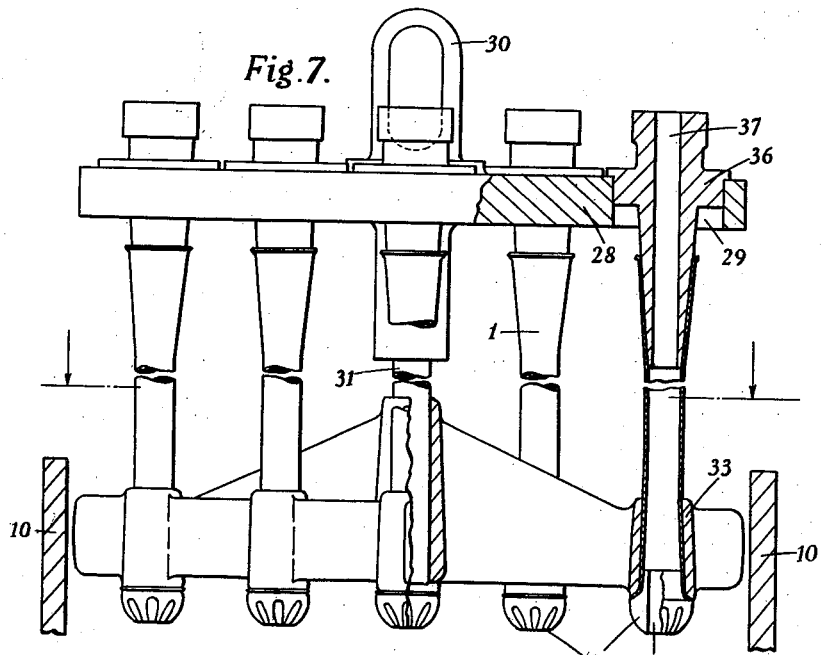
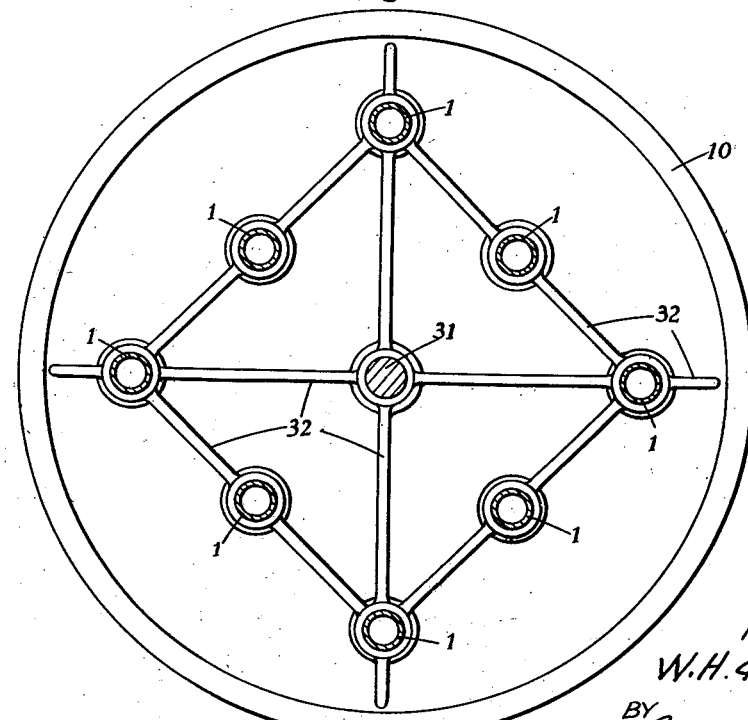

Oct. 28, 1941.  W. H. GRINT  2,260,282
PRODUCTION OF FLEXIBLE TUBES AND PIPES
Filed Oct. 23, 1937  8 Sheets-Sheet 5
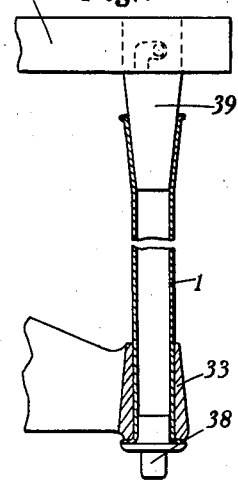
Fig. 9.
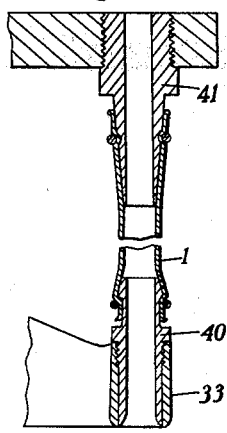
Fig. 10.
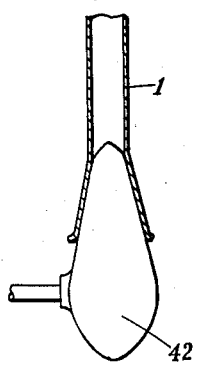
Fig. 11.
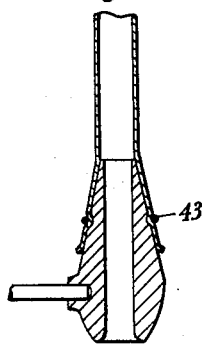
Fig. 12.
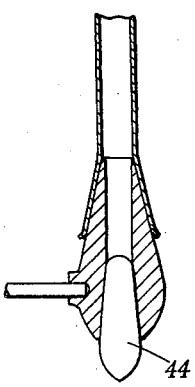
Fig. 13.
Fig. 20.
INVENTOR
W.H. GRINT
BY
ATTORNEYS Oct. 28, 1941.   W. H. GRINT   2,260,282
PRODUCTION OF FLEXIBLE TUBES AND PIPES
Filed Oct. 23, 1937   8 Sheets-Sheet 6

INVENTOR
W. H. GRINT.
BY
ATTORNEYS

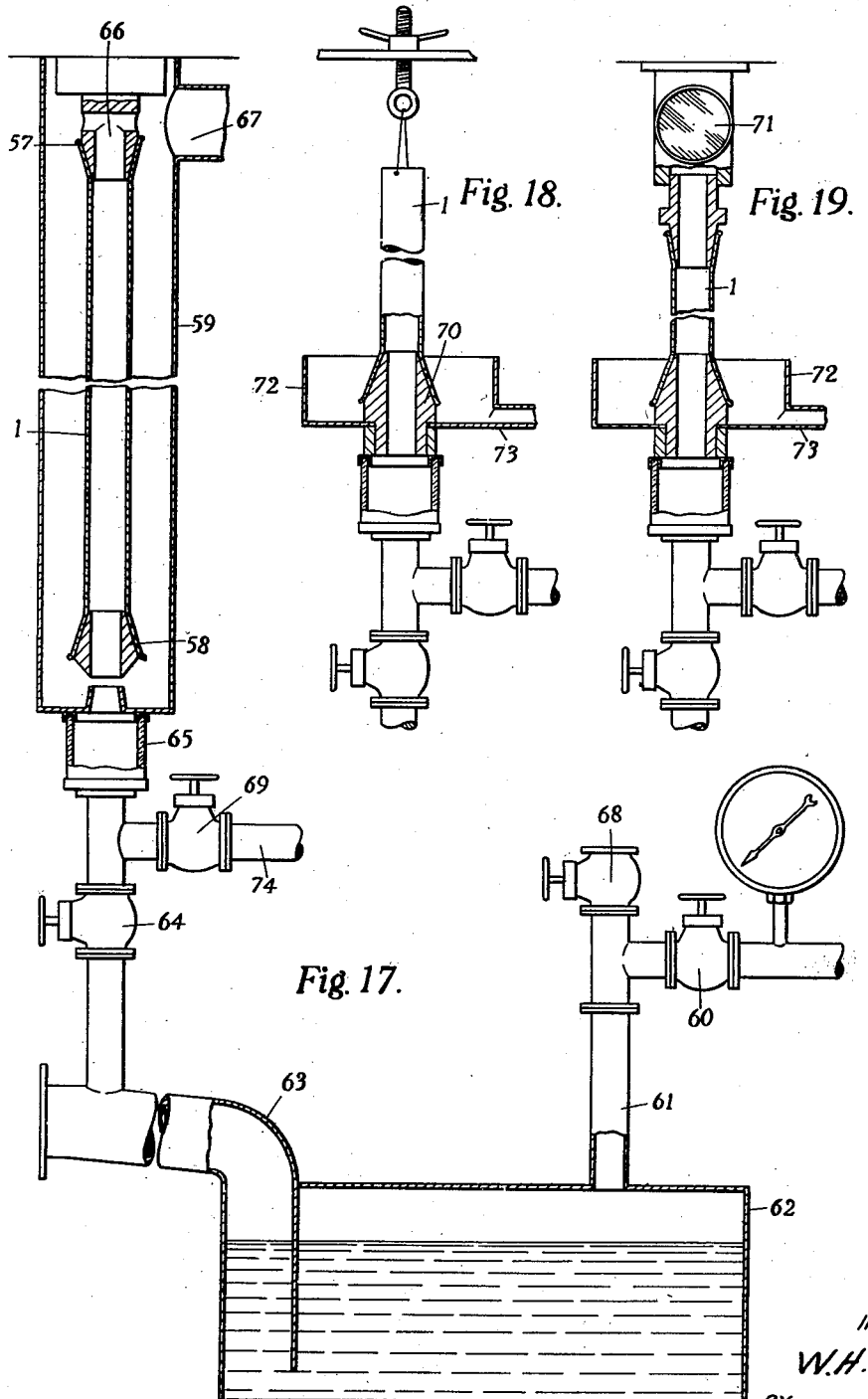

Patented Oct. 28, 1941

2,260,282

UNITED STATES PATENT OFFICE 2,260,282

PRODUCTION OF FLEXIBLE TUBES AND PIPES

William Horace Grint, Trading Estate, Slough, England

Application October 23, 1937, Serial No. 170,708
In Great Britain October 30, 1936

1 Claim. (Cl. 154—8)

This invention relates to flexible tubes or pipes and to the manufacture thereof.

In order to provide a flexible tube unaffected by the action of petrol and oil, it has already been proposed to make tubes of various materials built up on a spiral of wire. Such flexible tubes have a convoluted form with a corrugated inner wall which results in a much higher hydraulic resistance than smooth bore metallic tubes of equivalent size; at the same time to suit this construction, special end fittings have to be used. For these reasons a flexible tube with a smooth bore is preferable. Indeed, it has also been proposed to manufacture such smooth bore tubes by dipping a mandrel several times in polyvinyl alcohol or derivatives of polyvinyl alcohol so as to build up a tube layer by layer on the mandrel. However, this method gives rise to difficulties owing to which the bore and length of tubes which can be made in this way are limited, the chief difficulty being the removal of the tube from the mandrel.

One object of the invention consists in the method of manufacturing a flexible tube which includes the step of setting up such relative movement between a pre-formed flexible tubular former and a mass of liquid medium that at least one surface of the former is first covered and then uncovered by the mass of medium, thereby leaving on the surface a layer of medium which, when dry, provides with the former a composite tube with a smooth surface. The relative movement between the former and the mass of medium may be effected by immersing the former in the mass or by forcing the liquid upwards in contact with the former or by allowing the medium to run downwards under the action of gravity in contact with the former.

The invention particularly aims at providing a strong pliable tube with a smooth bore. Thus, another object of the invention is the method of manufacturing a flexible tube which includes the step of setting up relative reciprocating motion between a pre-formed braided or woven former and a mass of liquid medium within the former to cover the inner surface of the former and then to uncover that surface, leaving on the surface a layer of medium which, when dry, provides with the former a composite tube having a smooth bore.

Owing to the fact that a pre-formed tubular former will retain its shape without any internal mandrel, the former may be supported without the use of such a mandrel during the building up of the liquid medium on the former. Accordingly, there is no mandrel to prevent the medium from being deposited on the inner wall of the former. It is, in fact, particularly advantageous to build up the liquid medium on the inner wall of a former, when the latter is made of textile material and the tube is to be used for conveying gasoline to an engine, because the inner coating prevents the carburetter jets of the engine being choked by fluff picked up from the former by the gasoline.

Yet another object of the invention consists in a flexible tube, the wall of which comprises a tubular mass of material, such as polyvinyl alcohol, and an internal reinforcement of braided metal wire gauze. A braided metal wire former readily retains its pre-formed shape without any internal support along its length. Further, a braided wire former of fairly open mesh has the advantage that, when it is coated both internally and externally with the liquid medium, the inner and outer coats unite in the interstices between the wires. The two layers of medium, in fact, become a substantially homogeneous tubular unit with the braided wires embedded in it. Thus, so long as the mesh of the wire braiding is kept as open as possible and the wires as fine as possible in relation to the thickness of the tube wall, the finished tube consists mainly of the medium with only sufficient wire braid to maintain its form and the natural flexibility of the medium appears in the finished tube. In the case of a metal former made of open mesh braiding, with each interstice substantially in the form of a square having a side of one-sixteenth of an inch, the interstices being covered only with a film of polyvinyl alcohol, it has been found that the tube will withstand a pressure as high as 200 lbs. per square inch. The metal wires of which the braiding is formed may be either single wires or composite wires in the form of flat strips consisting of a number of wires side by side in contact with each other.

It is preferable for the former to be supported with its axis vertical or substantially vertical when undergoing treatment with the coating medium.

In carrying the invention into effect, it is usually desirable to give the tubular former successive treatments with the medium and to dry the tube after each treatment so that a coating of the dried medium is built up layer by layer on the inner or outer surface or both. When the pre-formed tubular former is made of braided or woven material, the invention enables a smooth bored tube to be produced which not only renders the tube impervious to the fluid, but also greatly reduces the skin friction.

When the relative movement between the flexible former of tubular form and the coating medium is effected by dipping the tube in the medium, it is convenient to arrange for a batch of formers, disposed side by side with their axes vertical, to be dipped in a well from which the batch is subsequently withdrawn for removal to a drying chamber. In an alternative arrangement, a pre-formed tubular former is held vertically while a quantity of the liquid medium is pumped upwards inside or outside the former and then allowed to recede so as to leave a layer of the medium deposited on the inner or outer wall of the former, the layer being subsequently dried. The liquid medium, after reaching the top of the former, may be allowed to spill over the upper edge of the former and run down the other side of the former so that both surfaces are coated with a layer of the medium. When the medium is pumped upwards outside the former and then allowed to recede, the former has to be mounted in a chamber, and may be so supported in the chamber that the medium rises and falls simultaneously both inside and outside the former to cover both its surfaces with the medium.

In all the methods according to the invention, the viscosity of the medium may be controlled and the number of coats needed for any given thickness of tube wall can be selected at will. The medium may be heated and the pre-formed former may be given a preliminary coating of medium which is less dense than the subsequent coat or coats. This use of a thin solution for the first coat ensures quick wetting of the surface to be coated and penetration of the interstices when the tubular former is woven or braided. The thin solution is also less likely to trap air. Alternatively, the former may be wetted by water, spirit or such other liquid as is suited to the medium subsequently to be used. This initial wetting facilitates the flow of the medium over the surface to be coated, and is particularly useful when the tubular former is of metal braid. Other forms of preliminary treatment may be necessary. For example, when galvanised steel wire braid is to be coated with a synthetic resin varnish, good adhesion of the varnish to the zinc coating of the wire may be obtained if the braid is subjected to a dipping treatment prior to the application of the varnish.

Additional coatings of different kinds may be applied selectively to the tubular former. Thus, the former may first have its inner surface or both its inner and outer surfaces coated with a medium that is well suited to resist the fluid which the finished tube will have to carry. Then, a medium which is cheaper or more suited to withstand the external conditions to which the finished tube is to be subjected, may be applied to the outer surface only, means being provided for stopping the flow of medium inside the tubular former.

The properties of the mediums used must be such that they are flexible, and preferably elastic, when dry. They must also be resistant to the liquid or gas to be handled by the finished tube and posses good ageing properties. In some cases, also, the mediums may be called upon to resist high temperatures. Cellulose lacquers, rubber solutions, synthetic rubbers in solution, and solutions of synthetic resins, particularly solutions of polyvinyl alcohol or its derivatives, may be used as coating mediums. With many forms of synthetic resin, it is desirable to add a plasticising agent. The mediums may have fillers introduced such as metallic powders or asbestos fibre.

The tubular formers employed may, as indicated above, be formed by braiding or weaving, in which case metal, paper or textile threads may be used. Alternatively, the former may consist of a rubber hose or a flexible metallic tubing. When the material of the former is such that it will not readily maintain its shape, it may be treated with a stiffening material. Thus, thin cotton braid may be stiffened by starch or wax to ensure the shape of the former being maintained during the coating process.

A great variety of shapes or forms of tubular formers may be used in carrying out the invention which, unlike those processes in which a pipe is coated as it is formed on a loom or braiding machine, is not limited to the manufacture of simple cylindrical pipes or tubes but not only enables tubes of any desired cross-section to be made but enables the cross section to vary along the length of the tube while yet the tube has a smooth bore.

In certain circumstances, the coating medium may have to be subjected to a hardening treatment, and in this case, the built-up tube may have to be immersed in a bath of some hardening solution or this hardening solution may be circulated through the tube. As an example, if a solution of polyvinyl alcohol is the liquid medium employed, it may be hardened by immersion in a bath of formaldehyde. Usually, however, the hardening is performed by placing the coated tube in an oven. In this case and in the case of ordinary drying, as with hot air, it is very important that the inner surface of the tube shall be adequately treated. The treatment of the inner surface is best effected by circulating heated air through the tube.

The outer surface of the tube may be given a final coating of paint or a medium containing a metallic powder so as to give the appearance of metal. Alternatively, the tube may be given a protective covering such as a lapping of tape, a woven or braided covering of wire or textile yarn, or a rubber covering.

From the foregoing remarks it will be seen that the invention is concerned with the building up of a tube from a liquid medium upon a former which remains part of the finished tube. It may be employed in making tubes of any desired cross-section and of uniform or varying cross-section along its length. Furthermore, the invention provides tubes of increased strength due to the reinforcement or alternatively it provides a tube of given strength with less material and this reduces production costs.

In order that the invention may be clearly understood and readily carried into effect, various methods and apparatus for use in carrying out those methods will now be described, by way of example, with reference to the accompanying drawings, in which:

Figure 4 is a diagrammatic illustration of an apparatus for drying the finished tubes by sucking heated air through them;

Figure 5 is a side elevation and Figure 6 a sectional end elevation on the line VI—VI in Figure 5 of a modified form of construction of the upper supporting header for the tubular formers;

Figure 7 is a side elevation, on a larger scale, of an assembly, partly in section, as used in the apparatus of Figures 1 and 2;

Figure 8 is a sectional plan of the assembly of Figure 7;

Figures 9 and 10 are respectively part-sectional and sectional elevations showing ways in which the assembly of Figures 7 and 8 can be modified.

Figure 11 is a part sectional elevation of part of a further modified version of the assembly of Figures 7 and 8;

Figures 12 and 13 are sectional elevations of modifications of the part shown in Figure 11;

Figure 17 is a sectional side elevation of yet another form of apparatus;

Figures 18 and 19 are sectional side elevations of modifications of the apparatus in Figure 17; and Figure 20 is an elevation of part of a braided tube, partly in section.

Figure 1:
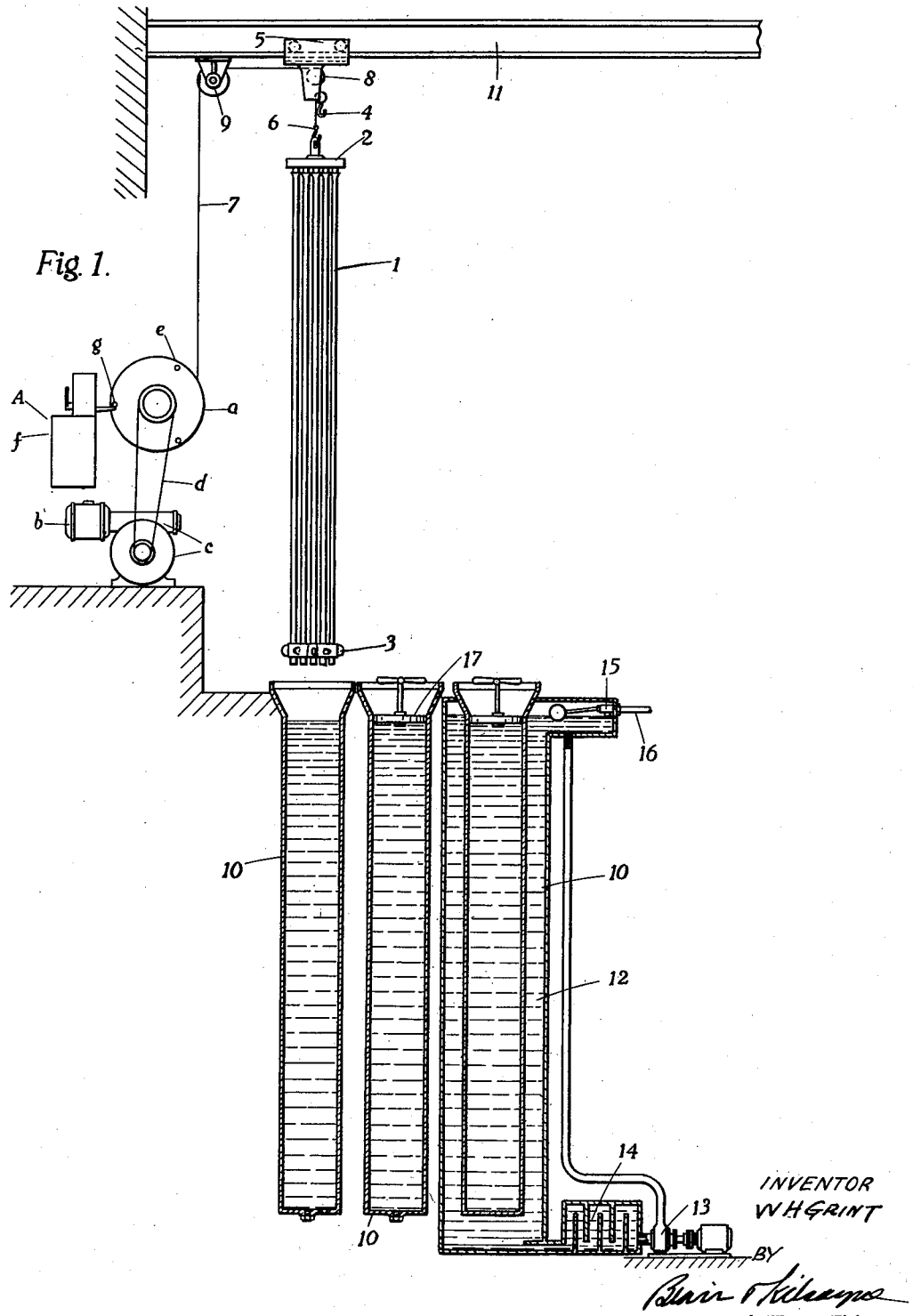
Figure 1 is a side elevation of one apparatus, partly in section.

In using the apparatus of Figure 1, a number of pre-formed formers 1 of tubular form, to be coated by dipping, are arranged vertically between two frames 2 and 3, the assembly being suspended either from a hook 4, fixed to an overhead conveyor 5, or, as shown in Figure 1, from a hook 6, at one end of a cable 7 passing over a pulley 8, on the conveyor, and a pulley 9 to electrically-driven lowering and lifting gear A. When the nest of formers is on the hook 6, the conveyor 5 is fixed in position for the assembly to be lowered into a dipping well 10, three of which are shown in Figure 1. The lowering gear illustrated diagrammatically in Figure 1, includes a large winding drum a driven from an electric motor b through reduction gearing c and belting d. The motor b is switched on by hand so that the drum a rotates to lower the nest of tubular formers 1 into the dipping chamber or well 10. When the formers 1 are submerged to the required depth, an adjustable tappet e on the rim of the drum a automatically opens the motor switch f and starts a solenoid time switch, which after a predetermined time for which it is set, starts the motor b again in the opposite direction, thereby raising the nest of formers 1 from the chamber 10.

A second adjustable tappet g on the drum a switches off the motor b when the formers 1 are fully withdrawn. The tubular formers are steadily immersed at a predetermined rate. This eliminates the risk of air being entrained and of the medium being disturbed during the movement of the nest of formers within a dipping well. The correct timing of the immersion and withdrawal ensures that the thickness of the coating shall be uniform and of the required dimensions. Where more simple apparatus is required, the electrically-driven gear may be replaced by hand-operated tackle.

After immersion, the former assembly is removed from the hook 6 and hung on the hook 4. The conveyor 5 is then run along an overhead rail 11 to a drying chamber or oven shown in Figure 2. After drying, the former assembly may be returned to the dipping wells 10 for a further immersion to increase the thickness of the coating. The number of immersions and intermediate drying treatments depends, of course, on the nature of the coating medium and upon the thickness of the wall required. The apparatus lends itself to the simultaneous treatment of a number of former assemblies, in which case the assemblies are lowered simultaneously into their respective wells and withdrawn simultaneously from the wells, subsequently being taken to the drying chamber to be treated simultaneously therein. The former assembly, or each assembly, may be dipped first in one well containing a thin solution of the coating medium or another liquid, such as water or spirit, which serves to wet the surfaces of the formers thereby facilitating the flow of the coating medium over their surfaces when the formers are dipped in a second well containing the coating medium proper. If necessary, the wells may be provided with heating jackets, the right hand well 10 in Figure 1 being shown with such a jacket 12. Water or oil may be circulated through the jacket 12 by means of a pump 13, the circuit including a heater 14. A ball cock 15, controlling an overflow pipe 16, is mounted at the upper end of the jacket 12 so as to control the level of liquid therein. In some circumstances, it may be found desirable to circulate steam through the jacket instead of a liquid. Surface discs 17 are put to float on the medium in the wells so as to keep the medium clean and prevent surface oxidation when the medium is not in use.

Figure 2:
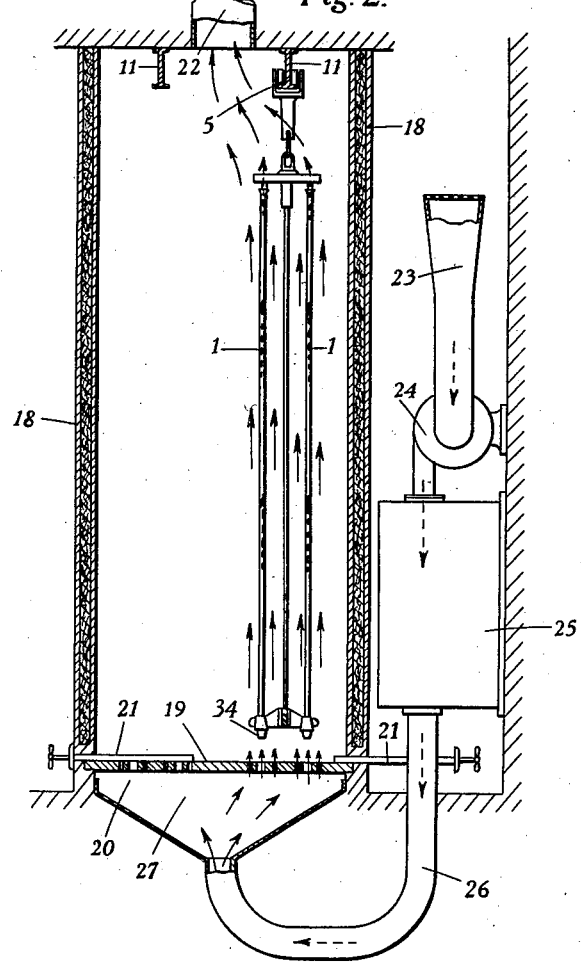
Figure 2 is an end elevation of apparatus, partly in section, for use in conjunction with the apparatus of Figure 1.
Figure 3:
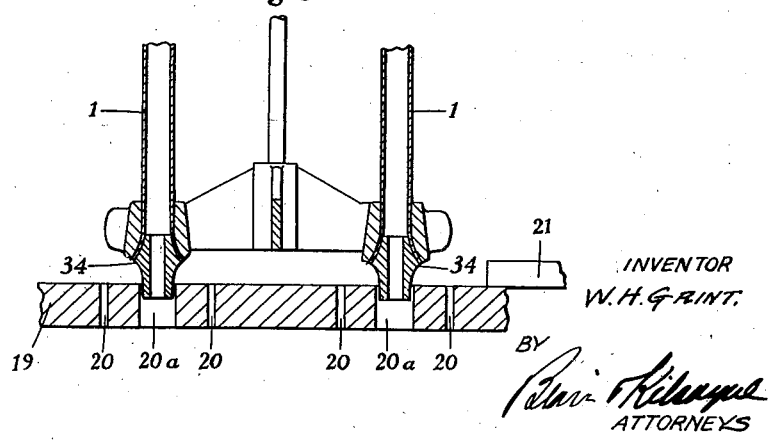
Figure 3 is a sectional elevation to an enlarged scale of a detail of Figure 2.

The drying chamber or oven shown in Figure 2 has walls 18 lagged with heat-insulating material and a floor 19 formed with hot air ports 20 which can be selectively opened and closed by means of sliding valve plates 21. In Figure 2, the left hand floor ports 20 are shown closed by their respective valve plate 21, while the right hand floor ports are shown open, the right hand valve plate 21 being in its retracted position. As shown, there are a set of three air ports 20, 20a corresponding to each tubular former 1, the centre hole 20a, being sufficiently large to allow the nozzle plug 34 to enter it when the former assembly is lowered to a sufficient extent as seen in Figure 3. The smaller holes 20 merely admit the heated air for drying the outside surfaces of the tubes 1. This arrangement makes the passage of heated air through the inside of the tubes more certain and, in fact, the provision of the smaller holes 20 is not very important as the air in the oven may be maintained at the desired temperature merely by leakage from the large holes 20a into the oven. The hot air is thus directed, by being caused to pass through the right hand ports, on to the former assembly hanging immediately above these ports. The air, after passing over the formers, is discharged through a chimney 22 at the upper end of the chamber. The drying air is drawn through a funnel 23 by a fan 24 and delivered first through a heater 25 and then through a pipe 26 to a manifold 27, from which the ports 20 lead.

It is often found preferable, instead of blowing the heated air up through the tubes as described with reference to Figures 2 and 3, to suck the air up through the tubes 1. The reason is that it leaves the bottoms of the tubes 1 free to drip. Then, of course, it is not necessary to leave the tubes 1 so long over the tanks 10 (Figure 1) to drip since drying can take place in the drying oven before the coating of liquid medium has much chance to run.

One form of suitable apparatus for this purpose is shown in Figure 4. The top plate 75 of the frame is provided with a reasonably air-tight cover 76 which has an air pipe 77 through which air can be drawn. The air pipe 77 is connected to an air suction trunk 78 by a removable flexible tube 79. The branches 77, 79 when not in use are shut off by means of cocks 80. The air trunk 78 is connected to the suction inlet of the air pump 24 by an inlet pipe 81, the air passing through the heater 25 and pipe 26 into the oven.

A further development of the suction method of drying suitable for use when rectangular wells are employed for the liquid medium is illustrated in Figures 5 and 6. The tubular formers 1 to be dipped are arranged in a straight row. This enables the top member 76 of the dipping frame to be made as a tube with the air pipe 77 leaving at the end.

The frames 2 and 3, between which the formers 1 extend, may take the form shown in Figures 7 and 8. In this case, only the lower frame is arranged for immersion, the upper frame consisting simply of a disc 28 formed with apertures 29 and carrying a ring 30 for receiving one of the hooks 4 or 6. The lower frame is designed to create but little disturbance of the medium, as the assembly is immersed, and is designed so that its total surface area is small and so that its surfaces prevent, as far as possible, any adhesion of the medium used. This lower frame, which is connected rigidly to the upper frame by a central rod 31, consists of a network of plates 32. The depths of these plates are considerable in relation to their cross-sections which are of streamline form. At various points in the network, the plates are formed with bushes 33, which receive the lower ends of the tubular formers 1. The formers 1 are clamped within the bushes 33 by means of plugs 34, as shown clearly on the right hand side of Figure 7. These plugs have central bores 35 through which the medium can pass during immersion, so that the formers are coated both internally and externally. The upper ends of the formers 1 are slipped over conical surfaces formed externally on members 36 which are pushed into the apertures 29 in the plate 28. These members 36 are formed with axial bores 37 for the inlet and outlet of air as the coating medium passes up and down within the formers 1. In the drying operation, the bores 35 in the plugs 34 and the bores 37 in the members 36 permit the drying air to pass through the formers 1.

In some cases where fairly short tubular formers are to be coated, an intermediate frame may be provided between the upper and lower frames. Two batches of formers, one between the upper frame and the intermediate frame, and the other between the intermediate frame and the lower frame, can then be treated simultaneously. In some cases, it is desirable to reverse the assembly between each dipping operation. In those cases, the upper and lower frames are of similar design and are both arranged for attachment to the hooks 4 and 6 (Figure 1).

In Figure 9, modified ways of securing the upper and lower ends of a tube 1 to the upper and lower frames are shown. The lower end of the tubular former 1 is secured to a bush 33 by means of a plug 38 which, unlike the plugs 34 in Figure 3, has no axial bore, so that the former 1 will only be coated on the external surface. The upper end of the former 1 in Figure 8 is slipped on to the external conical surface of a member 39 which is connected to a plate, similar to the plate 28 in Figure 7, by means of a bayonet joint.

A further modification is shown in Figure 10. In this case, the lower end of a tubular former 1 is clipped on to a tubular member 40 which is screwed into a bush similar to the bushes 33 in Figure 7. The upper end of the former 1 is clipped on to the conical external surface of a member 41, screwed in to a plate similar to the plate 28 in Figure 7. It will be appreciated that, when the formers 1 are secured at their ends to members that are detachably mounted on the upper and lower frame, various sizes of former may be accommodated between the same pair of frames by providing members, such as the members 40 and 41, corresponding to the sizes of the formers. These members 40 and 41 may, in fact, be regarded as adaptors suited to the size of the former to be used.

The rod 31 (Figures 7 and 8) may be dispensed with if the lower frame is sufficiently heavy to keep the formers straight. In the case of braided tubular formers, however, the lower frame must not be so heavy as to cause a substantial change in the cross-section dimensions of the formers. The weighted frame may consist of a spider having a streamline weight at the end of each limb. Such weights may fit into and provide the connections between the formers and the frame. One such weight 42 is shown in Figure 11. In this case, the arrangement is such that only the outside of the former will be coated. If both surfaces of the former are to be coated, the weight can be provided with an internal bore, as shown in Figure 12, which also shows the provision of a clip 43 for pressing the wall of the former into an annular groove on the outer surface of the weight so that the parts are more securely joined than when friction alone is relied upon. The weight may, as shown in Figure 13, be provided with an internal bore that is conical in form at its lower end. A conical plug 44 may be inserted into the lower end of the bore at any time in the dipping process when it is desired that only the outside surface of the former shall be coated.

When the lower frame is a spider, having weights, as shown in Figures 11, 12 and 13, at the ends of its limbs, the latter may be hinged relatively to each other so as to allow for variations in the lengths of the formers.

Figure 14:
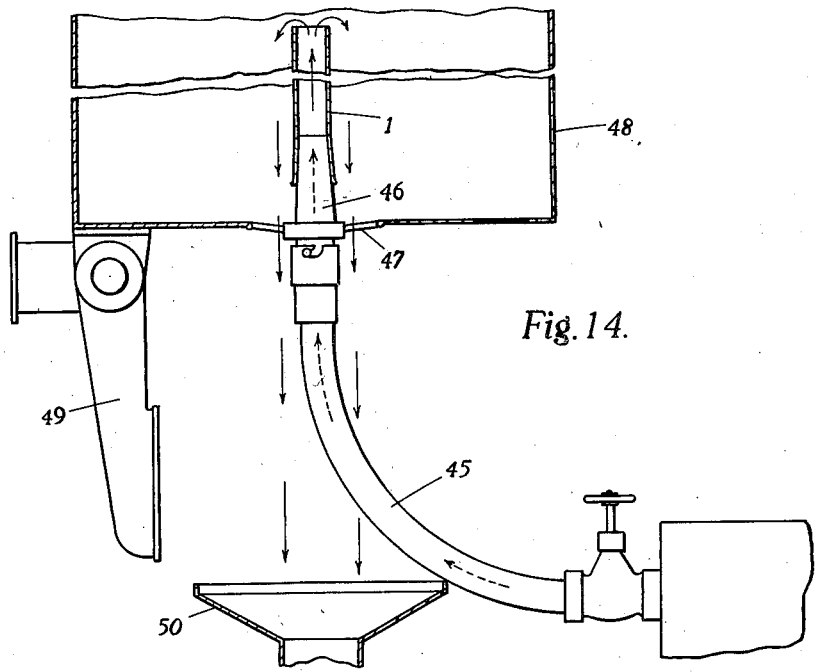
Figure 14 is a side elevation of a further form of apparatus, partly in section.

Figure 14 shows an arrangement for building up a coating on a tubular former 1 by forcing the coating medium up inside the former and then allowing the medium to recede. The medium is supplied through a pipe 45, which is connected through the medium of a bayonet joint to a nozzle 46 that fits into the lower end of the former 1 to be coated. This nozzle member 46 is carried by a spider 47 spanning an aperture in the floor of a chamber 48. If it is desired to coat only the inside of the former 1, the medium is forced upwards therein but is not allowed to run over the top of the former. The medium is then allowed to recede. The parts of the bayonet joint are then separated and a hood 49 is swung to the position shown in Figure 15, in which it covers the aperture containing the spider 47. Hot air is then fed through the hood so as to dry the medium. Next, the hood is swung back to the position of Figure 14 and the pipe 45 again connected to the nozzle 46 so that the second internal coating may be applied to the former 1.

In the case where it is required to coat both sides of the tubular former 1, the medium may be forced up inside the former to the top thereof so that it spills over the upper end of the former and runs down the outer surface thereof, as shown by the arrows in Figure 14, the surplus medium being received in a funnel 50. In the drying process, the hot air, delivered through the hood 49, passes upwards both inside and outside the former 1, so that the drying takes place simultaneously on both sides of the wall of the former.

Figure 15:
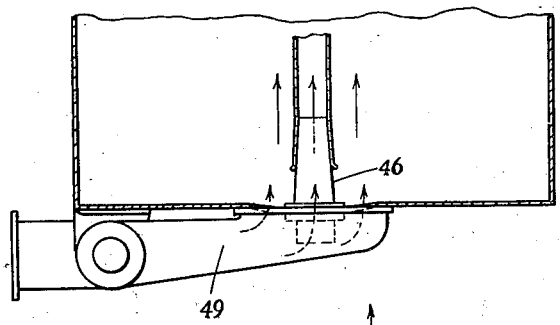
Figure 15 is a view similar to Figure 14 but with some of the parts in different positions.

It will be appreciated that an apparatus as shown in Figures 14 and 15 can be arranged to allow a number of formers to be treated simultaneously and in parallel in the same chamber 48, by providing a number of nozzles 46 and pipes 45.

Figure 16:
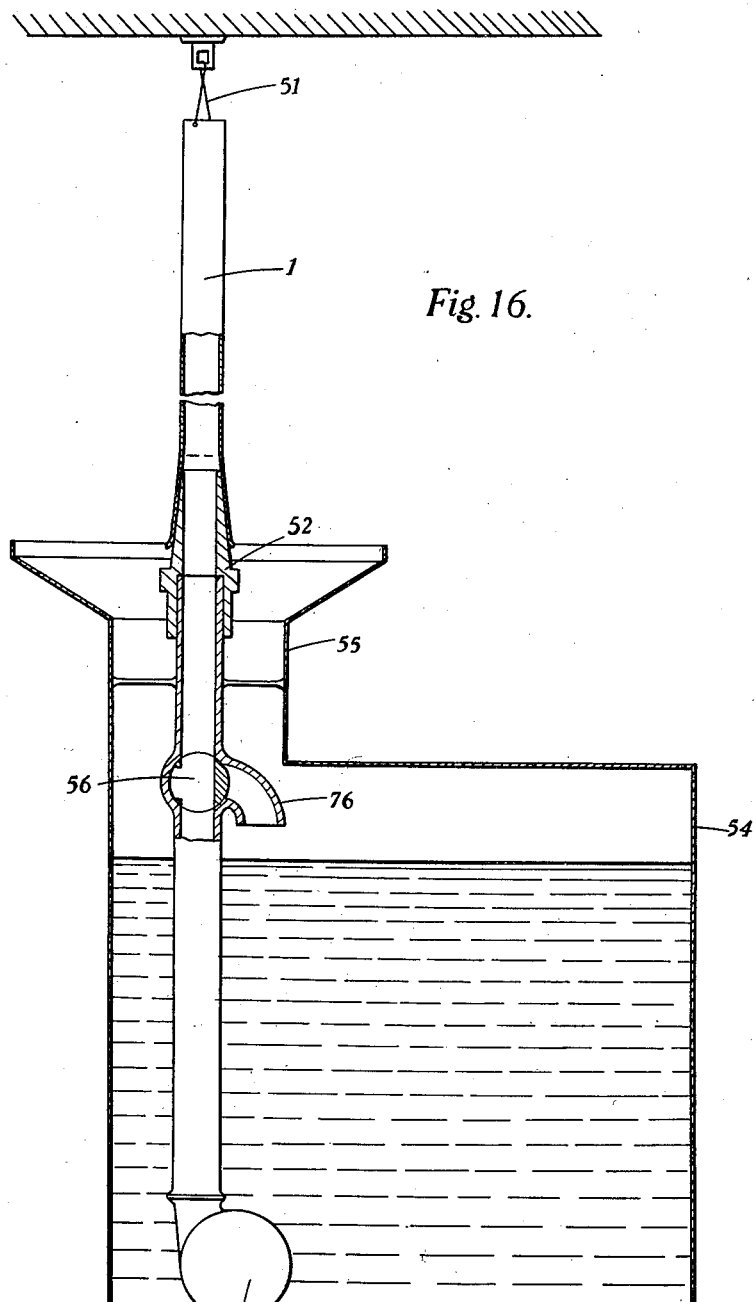
Figure 16 is a sectional side elevation of another form of apparatus.

Figure 16 shows a somewhat similar arrangement in which a tubular former 1, to be coated, is suspended at its upper end by a wire loop 51 and fits at its lower end over a nozzle 52. A wire loop, similar to the loop 51, may be used in the apparatus of Figure 14 for supporting the upper end of the former 1 in that figure. In Figure 16, a submerged pump 53 delivers coating medium from a tank 54 upwards through the nozzle 52. After overflowing at the upper end of the former 1, the medium runs down the outside thereof and returns through a funnel 55 to the tank 54. After a predetermined time, the pump 53 is stopped and a drain cock 56 is operated so as to allow the liquid within the former 1 to return to the tank 54 through a spout 76, the medium, as it recedes, leaving the desired coating within the former 1. Naturally, if only the inside of the former is to be coated, the medium is not permitted to spill over the top of the former.

In the apparatus of Figure 17, a tubular former 1, to be coated, is located between nozzles 57 and 58 within a chamber 59. To bring the coating medium into contact with the former 1, compressed air is admitted through a valve 60 and pipe 61 to a tank 62 containing the medium, while an exhaust valve 68 and a hot air valve 69 are closed. The medium is thus forced upwards through a pipe 63, a valve 64, and a sight glass 65 to the chamber 59. The medium passes upwards through the chamber, both inside and outside the former 1, and, as the medium rises, air is exhausted from inside the former 1 and from inside the chamber through conduits 66 and 67. After rising in the chamber 59, the medium is allowed to recede as a result of the closing of the valve 60 and the opening of the exhaust valve 68, which allows the compressed air to escape from the tank 62. To dry the formed tube, hot air is admitted to the chamber 59 through a pipe 74 by opening the valve 69 after the valve 64 has been closed. In this arrangement, it is necessary to prevent a thick layer of the medium from gradually building up on the walls of the chamber 59. Accordingly, a scraper, that is operated after each passage of the medium into the chamber 59, may be provided in the latter. Alternatively, the nature of the material from which the chamber 59 is made, or a surface treatment to which the inside surfaces of the chamber are subjected, may be such as greatly to reduce or completely to prevent the tendency for the coating medium to adhere to the inside of the chamber 59. For example, the latter may be tinned and polished internally.

The apparatus in Figure 17 may be modified as shown in Figure 18, the lower end of the tubular former 1 to be coated being fitted directly to a nozzle 70, so that the medium, instead of flowing simultaneously upwards both inside and outside the former 1, flows upwards only inside the former 1. After reaching the top of the latter, the medium overflows and runs downwards outside the former 1, leaving an external coating. Figure 19 shows a modification of the arrangement in Figure 18, in which the medium can only be passed up and down inside the former 1. In this case, a sight glass 71 is mounted at the upper end of the former 1, so that the operator can see when sufficient medium has been admitted. When the former 1 is a braided tubular member, some of the medium may ooze through the braided wall and run down the outside of the former, leaving an external coating.

In the arrangements shown in Figures 18 and 19, an external chamber like the chamber 59 in Figure 17 is unnecessary, although this may advantageously be provided in the construction of Figure 18 when the tube is to be dried in situ in the manner described with reference to Figure 17. When applied to the arrangement of Figure 18, the chamber would not be liable to receive a coating of medium on its walls. In the absence of the external chambers, the constructions shown in Figures 18 and 19 are provided with trays 72, having drain pipes 73, for collecting any medium that runs down the outsides of the formers.

The foregoing methods and apparatus need not necessarily be used for making simple cylindrical tubes, but they may be adapted to the formation of tubes having irregular cross-sections. The braided former of tapered shape shown in Figure 20, for example, may be used in accordance with the invention. The invention is also suited to the coating of pre-formed tubular formers having integral flanges at right angles to their axes. Such formers, having integral flanges, are useful in practice in that they may be connected directly to adjacent parts. This is particularly helpful in the aircraft industry where joints have to be made between tubes and tanks having such thin walls that comparatively heavy unions are impracticable.

When, as is usually the case in carrying out the invention, the tubular former is given a number of coats, it is desirable to allow time for the medium to flow into an even coating between each treatment with the medium and prior to each application of hot air for drying. However, it is not always necessary to use hot air or other special medium for drying or hardening. The drying may simply be allowed to take place by leaving the tube to stand at normal air temperature.

A tube capable of withstanding extremely high pressures may be formed by incorporating two or more concentric pre-formed tubular formers in the tube. Thus, a braided tubular former may be treated with the medium in any of the manners set out above and dried after the application of each layer. The resulting tube is passed through a braiding machine and thus another layer of braiding is tightly applied to the outside of the tube to provide the desired resistance to internal pressure. Then further layers of medium are applied to the outer surface only and drying effected after applying each layer. The number of layers of braiding may be such as desired, and finally the tube is provided with external coatings of the liquid medium with drying as already described.

When the pre-formed former is coated by forcing the medium upwards and allowing it to recede, as described, for example, with reference to Figure 17, it is not necessary for the tubes to be dried in situ. A number of tubular formers may, in fact, be arranged between frames in the manner described with reference to Figure 1, the assembly being first put in a chamber arranged like the chamber 59 in Figure 17 and then removed to a drying chamber like that shown in Figure 2.

I claim:

The method of manufacturing a flexible elastic tube or hose capable of withstanding extremely high pressure and resistant to the action of gasoline, which consists of the steps of making a braided tubular former, coating the inside and outside of said former by repeated relative dipping actions with a polyvinyl alcohol resin, allowing the resin to dry between each dipping action, superimposing another braided former tightly on the outside of said partially formed tube, and applying further layers of said resin to the outside of said tube in the same manner until the desired strength and size are obtained.

WILLIAM HORACE GRINT.